US011405881B1

(12) United States Patent
Harris et al.

(10) Patent No.: US 11,405,881 B1
(45) Date of Patent: Aug. 2, 2022

(54) CLOCK SYNCHRONIZATION IN MESH NETWORKS

(71) Applicant: Landis+Gyr Innovations, Inc., Alpharetta, GA (US)

(72) Inventors: Lawrence S. Harris, Duluth, GA (US); Alan B. Lowell, Duluth, GA (US)

(73) Assignee: LANDIS+GYR INNOVATIONS, INC., Alpharetta, GA (US)

( * ) Notice: Subject to any disclaimer, the term of this patent is extended or adjusted under 35 U.S.C. 154(b) by 0 days.

(21) Appl. No.: 17/197,860

(22) Filed: Mar. 10, 2021

(51) Int. Cl.
*H04W 56/00* (2009.01)
*H04W 84/18* (2009.01)
*H04J 3/06* (2006.01)

(52) U.S. Cl.
CPC ......... *H04W 56/003* (2013.01); *H04J 3/0635* (2013.01); *H04W 56/004* (2013.01); *H04W 56/0015* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 2006/0056403 | A1* | 3/2006 | Pleasant | H04L 43/0852 370/503 |
| 2016/0037449 | A1 | 2/2016 | Kandhalu Raghu et al. | |
| 2017/0156144 | A1 | 6/2017 | Shudark et al. | |
| 2018/0041329 | A1* | 2/2018 | Wang | H04W 56/0035 |
| 2021/0159938 | A1* | 5/2021 | Subraveti | H04W 56/00 |

OTHER PUBLICATIONS

International Patent Application No. PCT/US2022/017376, International Search Report and Written Opinion dated Jun. 8, 2022, 15 pages.

* cited by examiner

*Primary Examiner* — Anh Ngoc M Nguyen
(74) *Attorney, Agent, or Firm* — Kilpatrick Townsend & Stockton, LLP

(57) ABSTRACT

A method for maintaining synchronization of nodes in a mesh network includes: receiving primary beacons from a first transmitting node during a predetermined time interval, each of the primary beacons comprising time information indicating a time that a respective primary beacon was transmitted; comparing the time that each of the primary beacons was transmitted with a time that each of the primary beacons was received to determine a time difference; accumulating the time difference for each primary beacon received from the first transmitting node during the predetermined time interval to generate a first time synchronization error; comparing the first time synchronization error to a first threshold value; and in response to determining that the first time synchronization error exceeds the first threshold value, transmitting a first request to the first transmitting node to increase a rate of beacon transmissions for a specified period of time.

20 Claims, 6 Drawing Sheets

| 122a | 122b | 122c | 122d | 122e | 123a | 123b | 123c | 123d | 123e | 124a | 124b | 124c | 124d | 124e |
|---|---|---|---|---|---|---|---|---|---|---|---|---|---|---|
| Time Slot 1 | Time Slot 2 | Time Slot 3 | Time Slot 4 | Time Slot 5 | Time Slot 6 | Time Slot 7 | Time Slot 8 | Time Slot 9 | Time Slot 10 | Time Slot 11 | Time Slot 12 | Time Slot 13 | Time Slot 14 | Time Slot 15 | Time Slot 16 |
| Chan. 4 | Chan. 6 | Chan. 3 | Chan. 5 | Chan. 7 | Chan. 4 | Chan. 6 | Chan. 3 | Chan. 5 | Chan. 7 | Chan. 4 | Chan. 6 | Chan. 3 | Chan. 5 | Chan. 7 | Chan. 4 |

CLOCK SYNCHRONIZATION IN MESH NETWORKS

BACKGROUND

Unless otherwise indicated herein, the materials described in this section are not prior art to the claims in this application and are not admitted to be prior art by inclusion in this section.

Time Slotted Channel Hopping (TSCH) mesh network radio nodes track time with high accuracy so that nodes know when to switch channels and when to transmit or receive so that a destination node is listening. Network nodes receive beacons from neighboring nodes in the mesh network to maintain more accurate time synchronization. Each network node includes a local oscillator that maintains local time synchronization for the node between beacon receptions. However, accuracy of the local oscillator for a node may degrade over time and require beacons to be received more frequently to maintain time synchronization. A high beacon message density may be chosen to accommodate oscillator drift over time; however increasing the number of beacon messages creates a large traffic burden for the entire mesh network that can cause performance problems.

SUMMARY

Apparatuses and methods for maintaining time synchronization of nodes in a mesh network are provided.

According to various aspects there is provided a method for maintaining synchronization of nodes in a mesh network. In some aspects, the method may include: receiving, by a receiving node, primary beacons from a first transmitting node during a predetermined time interval, each of the primary beacons including time information indicating a time that a respective primary beacon was transmitted, the receiving node having a primary association with the first transmitting node; comparing the time that each of the primary beacons was transmitted with a time that each of the primary beacons was received as indicated by a clock in the receiving node to determine a time difference; accumulating the time difference for each primary beacon received from the first transmitting node during the predetermined time interval to generate a first time synchronization error; comparing the first time synchronization error to a first threshold value; and in response to determining that the first time synchronization error exceeds the first threshold value, transmitting a first request to the first transmitting node to increase a rate of beacon transmissions for a specified period of time. Accumulating the time difference may include adding each determined time difference as a signed integer value.

The method may further include determining, by the receiving node, a second time synchronization error after the specified period of time for receiving beacons at an increased rate expires. In response to determining that the second time synchronization error exceeds the first threshold value, transmitting a second request to the first transmitting node to increase the rate of beacon transmissions. The receiving node may be prohibited from transmitting additional requests during the specified period of time.

The method may further include comparing the first time synchronization error to a second threshold value; and in response to determining that the first time synchronization error exceeds the second threshold value, transmitting a notification to a central system.

The method may further include receiving, by the receiving node, secondary beacons from a second transmitting node during the predetermined time interval, each of the secondary beacons including time information indicating a time that a respective secondary beacon was transmitted, the receiving node having a secondary association with the second transmitting node; comparing the time that each of the secondary beacons was transmitted with a time that each of the secondary beacons was received as indicated by the clock in the receiving node to determine a time difference; accumulating the time difference for each secondary beacon received from the second transmitting node during the predetermined time interval to generate a second time synchronization error; comparing the second time synchronization error to the first time synchronization error; and in response to determining that the first time synchronization error is greater than the second time synchronization error, causing the receiving node to change the primary association from the first transmitting node to the second transmitting node.

According to various aspects there is provided a network device. In some aspects, the network device may include: a clock configured to keep a local time; a memory configured to store data and instructions; a radio configured to communicate with a mesh network; and a processor in communication with the clock, the memory, and the radio. The processor may be configured to: receive, via the radio, primary beacons from a first transmitting node during a predetermined time interval, each of the primary beacons comprising time information indicating a time that a respective primary beacon was transmitted, the network device having a primary association with the first transmitting node; compare the time that each of the primary beacons was transmitted with a time that each of the primary beacons was received as indicated by the clock to determine a time difference; accumulate the time difference for each primary beacon received from the first transmitting node during the predetermined time interval to generate a first time synchronization error; compare the first time synchronization error to a first threshold; and in response to determining that the first time synchronization error exceeds the first threshold, transmit, via the radio, a first request to the first transmitting node to increase a rate of beacon transmissions.

The network device may further include a first counter configured to accumulate the time difference for the primary beacons by adding each determined time difference as a signed integer value.

The processor may be further configured to receive, via the radio, the primary beacons from the first transmitting node at an increased beacon transmission rate for a specified period of time based on the first request, wherein the increased beacon transmission rate ends when the specified period of time expires. In response to determining that the first time synchronization error exceeds the first threshold after the specified period of time expires, the processor may be is further configured to transmit a second request to the first transmitting node to increase the rate of beacon transmissions. The processor may be further configured to: prohibit the network device from transmitting additional requests during the specified period of time.

The processor may be further configured to compare the first time synchronization error to a second threshold; and in response to determining that the first time synchronization error exceeds the second threshold, transmit a notification to a central system.

The processor may be further configured to receive secondary beacons from a second transmitting node during the predetermined time interval, each of the secondary beacons comprising time information indicating a time that a respective secondary beacon was transmitted, the network device having a secondary association with the second transmitting node; compare the time that each of the secondary beacons was transmitted with a time that each of the secondary beacons was received as indicated by the clock to determine a time difference; accumulate the time difference for each secondary beacon received from the second transmitting node during the predetermined time interval to generate a second time synchronization error; compare the second time synchronization error to the first time synchronization error; and in response to determining that the first time synchronization error exceeds the second time synchronization error, change the primary association of the network device from the first transmitting node to the second transmitting node.

The network device may further include a second counter configured to accumulate the time difference for the secondary beacons by adding each determined time difference as a signed integer value.

According to various aspects there is provided a non-transitory computer readable medium. In some aspects, the non-transitory computer readable medium may include instructions for causing one or more processors of a receiving node to perform operations including: receiving primary beacons from a first transmitting node during a predetermined time interval, each of the primary beacons comprising time information indicating a time that a respective primary beacon was transmitted, the receiving node having a primary association with the first transmitting node; comparing the time that each of the primary beacons was transmitted with a time that each of the primary beacons was received as determined by a local clock to determine a time difference; accumulating the time difference for each primary beacon received from the first transmitting node during the predetermined time interval to generate a first time synchronization error; comparing the first time synchronization error to a first threshold value; and in response to determining that the first time synchronization error exceeds the first threshold value, transmitting a first request to the first transmitting node to increase a rate of beacon transmissions.

The operations may further include receiving the primary beacons at an increased beacon transmission rate for a specified period of time based on the first request, wherein the increased beacon transmission rate ends when the specified period of time expires.

The operations may further include, in response to determining that the first time synchronization error exceeds the first threshold value after the specified period of time expires, transmitting a second request to the first transmitting node to increase the rate of beacon transmissions. Additional requests may prohibited from being transmitted during the specified period of time.

The operations may further include comparing the first time synchronization error to second threshold value; and in response to determining that the first time synchronization error exceeds the second threshold value, transmitting a notification to a central system.

The operations may further include receiving secondary beacons from a second transmitting node during the predetermined time interval, each of the secondary beacons comprising time information indicating a time that a respective secondary beacon was transmitted, the receiving node having a secondary association with the second transmitting node; comparing the time that each of the secondary beacons was transmitted with a time that each of the secondary beacons was received to determine a time difference; accumulating the time difference for each secondary beacon received from the second transmitting node during the predetermined time interval to generate a second time synchronization error; comparing the second time synchronization error to the first time synchronization error; and in response to determining that the first time synchronization error exceeds the second time synchronization error, changing the primary association from the first transmitting node to the second transmitting node for receiving beacons.

Numerous benefits are achieved by way of the various embodiments over conventional techniques. For example, the various embodiments provide apparatuses and methods that proactively identify nodes in a mesh network that may be likely to lose synchronization with the network. In some embodiments, the node may determine whether synchronization issues are caused by a preferred parent node or whether the synchronization issues are caused by the node itself. Notifications regarding the synchronization issues may be periodically transmitted to a central system by the node. These and other embodiments along with many of its advantages and features are described in more detail in conjunction with the text below and attached figures.

BRIEF DESCRIPTION OF THE DRAWINGS

Aspects and features of the various embodiments will be more apparent by describing examples with reference to the accompanying drawings, in which:

FIG. 1 is diagram illustrating an example of a channel hopping protocol according to some aspects of the present disclosure;

DETAILED DESCRIPTION

Figure 2:
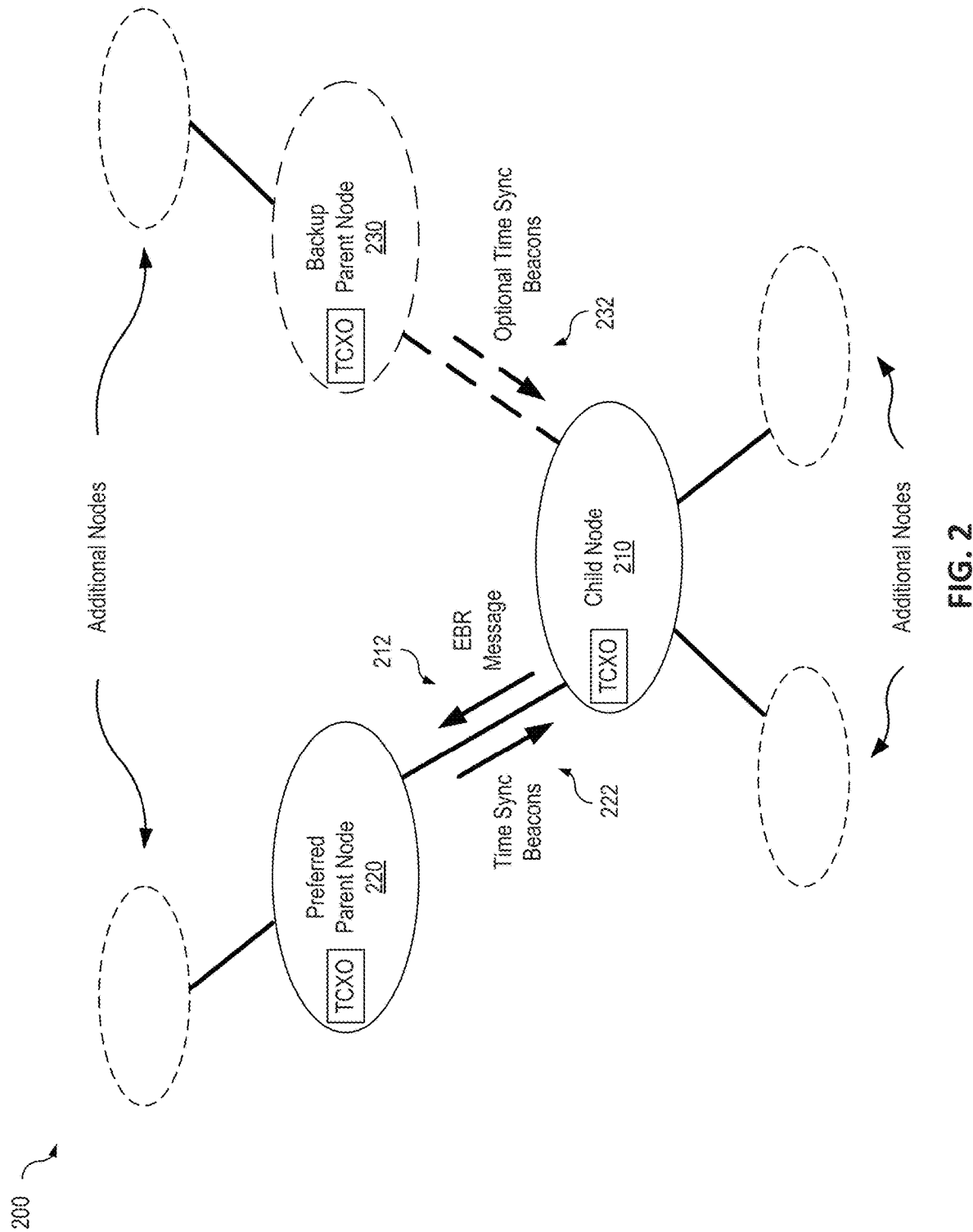
FIG. 2 is a diagram illustrating an example of a parent node and a child node in a mesh network according to some aspects of the present disclosure.

While certain embodiments are described, these embodiments are presented by way of example only, and are not intended to limit the scope of protection. The apparatuses, methods, and systems described herein may be embodied in a variety of other forms. Furthermore, various omissions, substitutions, and changes in the form of the example methods and systems described herein may be made without departing from the scope of protection.

A time-slotted channel hopping (TSCH) network, for example as defined by IEEE 802.15.4, can provide a communications network for resource providers (e.g., utility companies, home automation providers, industrial automation providers, etc. The resource providers may use the TSCH network to communicate between TSCH nodes (e.g., electric meters, routers, etc.), or endpoints (EPs), and low-energy (LE) devices, or LE endpoints (LEEPs), used to monitor or manage consumption of resources (e.g., electricity, heat, water, etc.). In some cases, nodes can be Internet- Of-Things (IoT) enabled devices that can be used in smart power grid and smart home technologies. TSCH uses a series of timeslots and multiple channel frequencies for communication between devices. While examples are shown and described with respect to TSCH networks, aspects of the present disclosure may be applied to other time synchronized networks without departing from the scope of protection.

FIG. 1 is a diagram illustrating an example of a channel hopping protocol according to some aspects of the present disclosure. A channel hopping protocol defines a channel frequency, or channel, for each timeslot in the hopping pattern. Each node communicating on the network may hop channels according to the channel hopping protocol. Referring to FIG. 1, the hopping pattern for the channel hopping protocol 110 corresponding to the timeslots 120 may be channel 4, channel 6, channel 3, channel 5, channel 7, i.e., it may associate channel 4 with timeslot 1, channel 6 with timeslot 2, channel 3 with timeslot 3, channel 5 with timeslot 4, and channel 7 with timeslot 5. A timeslot may be for example 25 ms resulting in 40 timeslots per second. Other timeslot lengths may be used. As illustrated in FIG. 1, a first iteration 125a of the hopping pattern contains timeslots 1-5 (122a-122e), a second iteration 125b of the hopping pattern contains timeslots 6-10 (123a-123e), and a third iteration 125c of the hopping pattern contains timeslots 11-15 (124a-124e).

TSCH mesh network radio nodes track time with high accuracy in order to synchronize channel switching and transmitting such that a destination node is listening. Each network device may include an oscillator, for example, a Temperature Controlled Crystal Oscillator (TCXO), to maintain a local clock for time synchronization with the network. Beacon messages, also referred to herein as "beacons," are sent from parent nodes (devices) to child nodes (devices) in the mesh network on an ongoing basis to maintain time synchronization to an accuracy greater than the accuracy provided by the oscillator.

FIG. 2 is a diagram illustrating an example of a parent node and a child node in a mesh network 200 according to some aspects of the present disclosure. As used herein, the terms "nodes," "network nodes," and "network devices" may be used interchangeably to mean devices that are capable of communicating on a mesh network. The beacons may be transmitted periodically by the parent node, for example, 2 to 3 times every seven minutes. Other time periods and/or number of beacons per time period may be used. FIG. 2 illustrates a child node 210 may have a primary association with a preferred parent node 220 to receive beacons 222 for time synchronization from the preferred parent node 220. The child node 210 may transmit data packets, for example, resource (e.g., electricity, water, gas, etc.) usage information, notifications, etc., to a central system (e.g., a head-end system of a utility provider) via the preferred parent node 220. When the child node 210 determines that its local time is drifting too far from the time provided by the beacons 222, for example, as a result of drift of the TCXO, the child node 210 may transmit an enhanced beacon request (EBR) 212 to the preferred parent node 220. The EBR 212 may cause the preferred parent node 220 to increase the number of beacons 222 it transmits.

In some cases, the child node 210 may optionally have a secondary association with a backup parent node 230 to also receive beacons 232 for time synchronization from the backup parent node 230. The backup parent node 230 may be another neighbor node in the mesh network 200. The child node 210 may use the optionally received beacons 232 from the backup parent node 230 for time comparison with the beacons 222 received from the preferred parent node 220. By comparing the times received from the two beacons, the child node 210 may determine whether a time draft is due to drift of its own internal oscillator or time inaccuracies in the beacon 222 provided by the preferred parent 220. In cases where the child node 210 determines that the time drift is due to inaccuracies in the beacon 222 provided by the preferred parent 220, the child node 210 may cause the backup parent node 230 to become its preferred parent node.

While FIG. 2 illustrates network nodes having TCXOs, other types of oscillators may be used without departing from the scope of the present disclosure. Further, while FIG. 2 illustrates a parent node communicating with one child node, a parent node may communicate with more than one child node, for example, a parent node may communicate with 20-30 or more child nodes. A parent node may maintain a neighbor table containing addresses of child nodes with which it communicates.

Oscillators may drift over time, which can affect the time synchronization of the network device. For example, an oscillator may have a nominal short-term drift of 1.5 parts-per-million (ppm) when the network device is first put into service. This short-term drift rate may enable the network device to maintain synchronization with the network for approximately 30 minutes. TSCH network devices used in Advanced Metering Initiative (AMI) applications may have an operation life exceeding 10 years. Over time, the accuracy of the oscillator may degrade approaching 10 ppm, thereby reducing the short-term synchronization time of the network device down to approximately five minutes.

Figure 3:
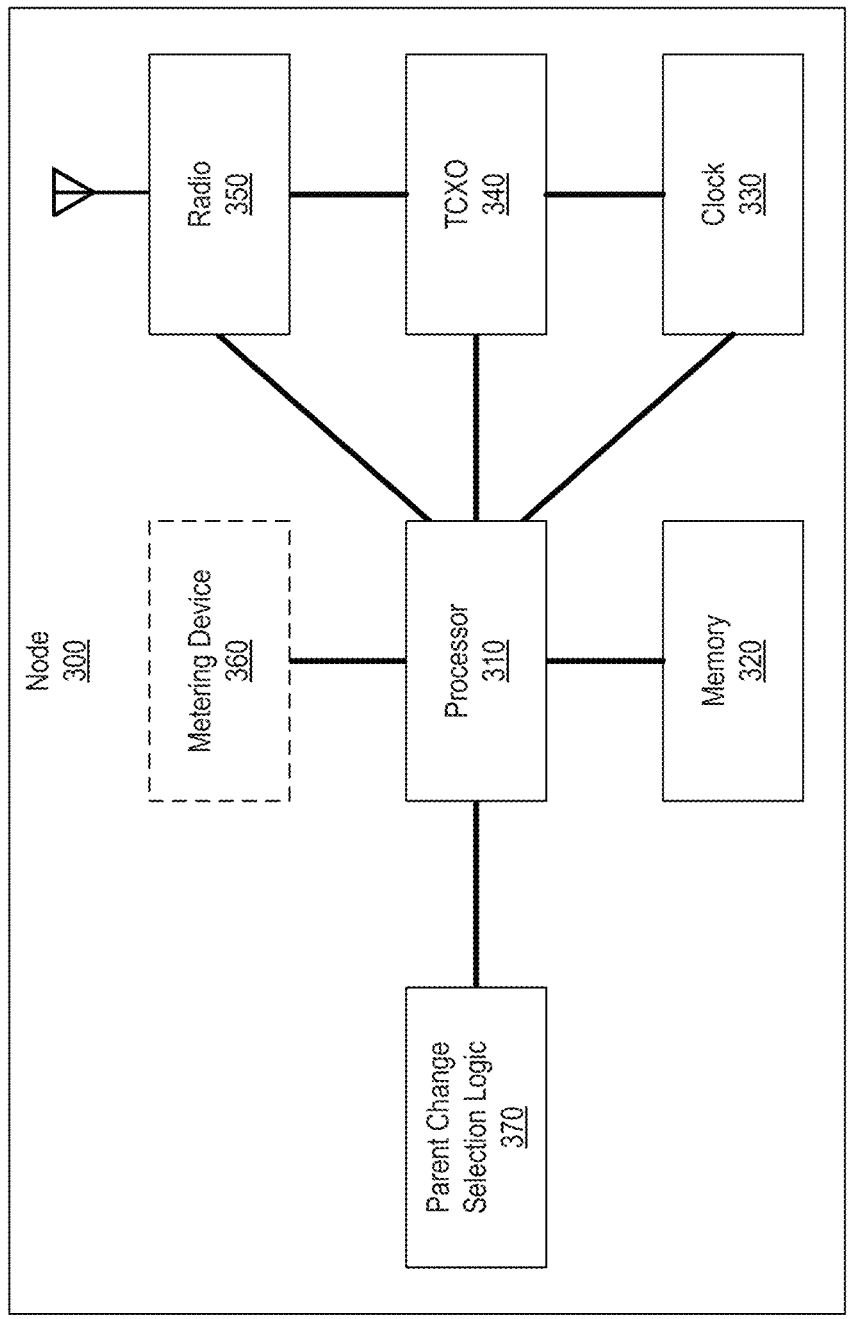
FIG. 3 is a block diagram illustrating an example of a node of a mesh network according to some aspects of the present disclosure.

According to aspects of the present disclosure, a method is provided that measures and tracks the time drift each node in a TSCH network based on the time information in beacon messages received from the node's preferred parent and optionally a backup parent. A processor of each node in the mesh network may be operable to perform the method. FIG. 3 is a block diagram illustrating an example of a node 300 of a mesh network according to some aspects of the present disclosure.

Referring to FIG. 3, the node 300 may include a processor 310, a memory 320, a clock 330, an oscillator 340, a radio 350, an optional metering device 360, and parent change selection logic 370. The processor 310 may be a microprocessor, microcomputer, computer, microcontroller, programmable controller, digital signal processor (DSP), application specific integrated circuit (ASIC), field programmable gate array (FPGA) or other programmable device. The processor 310 may execute instructions to control overall operation of the node 300. The processor 310 may receive data generated by metering device 360 including, but not limited to, energy use, voltage, current, etc., and may perform operations on, or processing of, the data.

The memory 320 may be a storage device such as a solid state storage device or other storage device, and may be a combination of volatile and non-volatile storage or memory. In some implementations, portions of the memory may be included in the processor 310. The memory 320 may be configured to store instructions executable by the processor 310, as well as data generated by the metering device 360, and other applications executable by the processor 310. The memory 320 may also store a neighbor table containing addresses of child nodes with which the node 300 communicates.

The clock 330 be implemented by the processor 310 or may be circuitry separate from the processor 310. The clock 330 may provide a time-base for time synchronization of the node 300 between receipt of beacons containing time information from a parent node. The oscillator 340 may be a temperature controlled crystal oscillator (TCXO) or another type of oscillator, for example, but not limited to, voltage controlled crystal oscillators (VCXO), oven controlled crystal oscillators (OCXO), ceramic oscillators, etc. The oscillator 340 may provide a frequency reference for the clock 330, the processor 310, the radio 350, and/or other components of the node.

The radio 350 may be a wired or wireless transceiver operable to communicate via various wired or wireless protocols as known in the field for example, but not limited to the AMI protocols. The radio 350 may enable the node 300 to communicate with other nodes in the mesh network (e.g., an AMI network) to receive beacons, transmit EBRs, parent change selection messages, etc. The radio 350 may also transmit data and notification signals to the utility provider (e.g., a head-end system) and receive any of updated program instructions, firmware updates, updates to other settings, or other communications. The oscillator 340 may provide a time-base for the radio 350.

The metering device 360 may include various sensors, for example, but not limited to, voltage measurement devices (e.g., voltage transformers), current measurement devices (e.g., current transformers), etc., and may monitor and/or record the energy usage at the customer premises. The metering device 360 may be controlled by a processor, for example, by the processor 310, or another processor included in the node 300. The metering device 360 may include an analog-to-digital (A/D) converter configured to convert signals received from the various sensors into digital values that may be processed by the processor.

The metering device 360 may communicate the information about energy usage to the head-end system via the processor 310 and/or the radio 350. For example, the metering device 360 may continually monitor and record total energy usage at the customer premises. In accordance with various aspects of the present disclosure, the metering device 360 may monitor and/or record days of the week and times of the day related to energy usage at the customer premises and communicate the information to the head-end system. In addition, the metering device 360 may perform as a sensor to detect and/or record abnormal measurements and/or events. Other information, for example, but not limited to, average power consumed, peak power, etc., may be monitored and communicated by the metering device 360.

The parent change selection logic 370 may determine whether the node 300 should continue to receive time synchronization beacons from a current preferred parent node. When the time synchronization error with the preferred parent node is determined to be excessive, the parent change selection logic 370 may select a new preferred parent node, for example the backup parent node, and may cause messages to be transmitted to the current preferred parent node and the new preferred parent node indicating the change. The parent change selection logic 370 may further configure the node to receive beacons from the new preferred parent node. The parent change selection logic 370 may determine that the node 300 should select a different preferred parent node for additional or alternative reasons, for example, but not limited to, weak received signal strength as determined for a received signal strength indicator (RSSI).

According to aspects of the present disclosure, a child node may determine a synchronization error (e.g., a time drift) between the local clock time of the child node and the time received via the synchronization beacons from a preferred parent node. For example, the child node may determine the synchronization error as an accumulated time difference between the local clock time of the child node and transmission time information included in each received beacon over a specified time period. When the synchronization error exceeds a threshold, the a child node may transmit a message to the preferred parent node to increase the beacon density (e.g., decrease the time interval between beacon transmissions) for beacons transmitted by the parent node. This can create single radio hops (e.g., only during transmission time periods for the child node) that have an increased beacon rate. Other parent nodes in the network may continue to transmit beacons at the nominal transmission rate. Thus, network performance problems caused by increasing the beacon rate for every node throughout the mesh network can be avoided.

The preferred parent may continue to transmit beacons at the increased beacon rate for a specified period of time. Alternatively, the preferred parent node may continue to transmit beacons at the increased beacon rate until the child node changes to a different parent, for example, a backup parent node.

To determine the synchronization error, the child node may accumulate the time difference between transmission time information provided by the beacons received from the preferred parent node and the local clock of the child node over a specified period of time. The child node may implement one or more counters to accumulate the time differences. The counters may be implemented by the processor (e.g., the processor 310) or by circuitry separate from the processor.

The time differences may be measured in microseconds ($\mu s$) and may be signed integer values. The accumulated time differences can provide a cumulative time difference (e.g., a time synchronization error) in microseconds. The processor (e.g., the processor 310) of the child node may convert the cumulative time difference to a time synchronization error in parts-per-million (ppm). The specified period of time may be a time period less than a time period equivalent to approximately a 10 parts-per-million (10 ppm) drift rate of time synchronization. For example, for a 10 ppm drift rate, the allowable time difference may be approximately 3000 $\mu s$ for a specified period of time may be less than approximately five minutes.

For a nominal beacon transmission rate of approximately two to three beacons every seven minutes, the child node may receive two or three beacons within a specified five minute time period. As an example of determining the time synchronization error, assume a child node receives three beacons from the preferred parent node within the specified five minute time period. The time difference between the time information provided by the first received beacon and the first time indicated by the local clock of the child node as determined by the processor (e.g., the processor 310) of the child node may be 800 $\mu s$. The time difference between the time information provided by the second received beacon and the second time indicated by the local clock of the child node may be 700 $\mu s$. The time difference between the time information provided by the third received beacon and the third time indicated by the local clock of the child node may be 900 $\mu s$.

The processor (e.g., the processor 310) of the child node may determine a cumulative time difference of 800 $\mu s$+700 $\mu s$+900 $\mu s$=2400 $\mu s$ over the specified five minute time period as the time synchronization error. The time synchronization error in microseconds may be converted into a time synchronization error in parts-per-million by the processor. For example, the 2400 μs time synchronization error equates to an 8 ppm time synchronization error. The cumulative time difference may be a signed integer value. For the current example, the time synchronization error (e.g., the cumulative time difference) should be less than 3000 μs during the specified five minute time period to remain within the specified 10 ppm drift rate. When the time synchronization error is low, for example, approximately 0.5-1.0 ppm, the child node may adjust its local clock accordingly. For time synchronization errors lower than approximately 0.5-1.0 ppm, the child node may not adjust its local clock. The individual time differences and the time synchronization error with respect to the beacons received from the preferred parent node may be stored in the memory (e.g., the memory 320) of the child node.

In some cases, the child node may also receive beacons from a backup parent node, for example, the backup parent node 230 illustrated in FIG. 2. The backup parent node may be a nearby node in the mesh network. If a backup parent node is available, the child node may determine and accumulate time synchronization errors between the beacons received from the backup parent and the local clock of the child node over the specified time period in the same manner as explained above for the preferred parent node. The individual time differences and the time synchronization error with respect to the beacons received from the backup parent node may be stored in the memory (e.g., the memory 320) of the child node.

A child node may determine operations to be performed based on the time synchronization error. When the child node determines that the time synchronization error exceeds an upper limit threshold value, for example, approximately 3 ppm or another value, the child node may transmit an Enhanced Beacon Request (EBR) to the preferred parent node to increase the rate (e.g., decrease the time interval) at which beacons are transmitted. For example, the preferred parent node may increase the beacon transmission rate from two or three beacons per five minute interval to four or five beacons per five minute interval. Other beacon transmission rates may be used. The upper limit threshold value may be configurable as a programmable value.

The preferred parent node may transmit beacons at the increased rate for a specified period of time, for example, four hours or another period of time. Other parent nodes in the network that have not received an EBR from a child node may continue to transmit beacons at the nominal transmission rate. After the specified period of time, the parent node may return to transmitting beacons at the nominal beacon transmission rate (e.g., two to three beacons in a five-minute period). The child node may continue to accumulate time synchronization errors during the EBR time period. If the child node again determines that the time synchronization error exceeds the upper limit threshold after the specified period of time has expired, the child node may transmit another EBR to the preferred parent node to again increase the beacon transmission rate. The child node may be prevented from transmitting additional EBRs during the specified period of time.

Upon receiving the EBR, the preferred parent node may update a list, for example, a neighbor table, containing the network address of the child node requesting the shorter beacon interval and a time limit for the request. The preferred parent node may receive EBRs from more than one child node and may include each one in the list. The preferred parent node may then adjust the beacon interval to transmit beacons at an increased transmission rate for a specified period of time for each received EBR. The preferred parent node may extend the period of time that beacons are transmitted at an increased transmission rate when an EBR is received from another child node during the specified period of time. For example, if the specified period of time for transmitting beacons at an increased rate is four hours, if an EBR is received from another child node after two hours of transmitting beacons at an increased transmission rate, the preferred parent node will continue to transmit beacons at an increased rate for six hours.

Counters may be implemented by the preferred parent node to track the specified period of time for each child node for which the preferred parent node received an EBR. The counters may be implemented by the processor of the preferred parent node or by circuitry separate from the processor. The preferred parent node may periodically check the list to determine whether the time limit has expired for any child nodes or whether a child node has moved to a different preferred parent. When there are no longer any child nodes with pending EBRs, the preferred parent node may return the beacon interval to a nominal beacon interval.

The child node may also compare the time synchronization error for the preferred parent node to warning limit threshold value. The warning limit threshold may be greater than the upper limit threshold value, for example, 10 ppm or another value. The warning limit threshold value may be configurable as a programmable value. If the child node determines that the time synchronization error exceeds the warning limit threshold value, the child node may transmit a notification to the network administrators (e.g., the head-end system) informing that the node is experiencing excessive time drift and may lose synchronization with the mesh network. For example, if the time synchronization error exceeds the warning limit threshold value during the EBR period, the child node may transmit a notification to indicate that repair or replacement may be needed.

In some cases, a child node may also receive beacons from a backup parent node, and may determine time synchronization errors with the backup parent node in the same manner as with the preferred parent node. In such cases, the processor of the child node may compare the time synchronization error of the preferred parent node to the time synchronization error of the backup parent node. If the time synchronization errors for the preferred parent node and the backup parent node are within a specified value of each other, for example 20% or another programmable value, it is likely that the time drift is primarily due to the child node itself. The child node may transmit a notification to the head-end system indicating that the time drift is caused by the child node.

In cases where the processor of the child node determines that the time synchronization error between the child node and the preferred parent node is greater than the time synchronization error between the child node and the backup parent node, the processor may signal the parent change selection logic (e.g., the parent change selection logic 370) that the time synchronization error with the preferred parent node is excessive. The parent change selection logic may determine that the child node should synchronize to a different preferred parent node. The parent change selection logic may cause messages to be transmitted to the backup parent node indicating that it is now the preferred parent node, and may transmit messages to the previous preferred parent node indicating that it is no longer the preferred parent node for the child node. The parent change selection logic may also configure the child node to receive beacons from the former backup node as the current preferred parent node.

Figure 4:
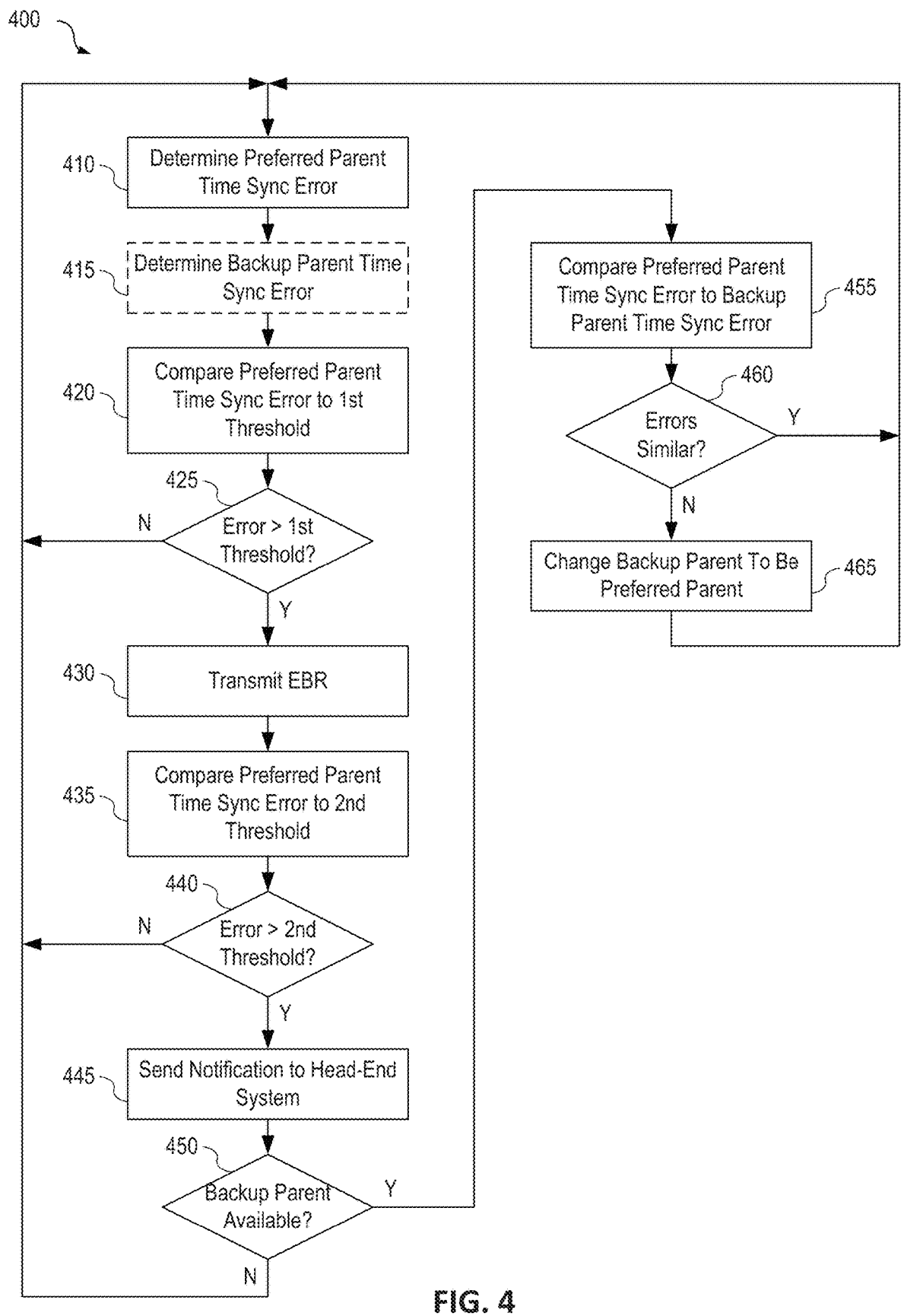
FIG. 4 is a flowchart illustrating an example of a method for maintaining synchronization of nodes in a mesh network according to some aspects of the present disclosure.

FIG. 4 is a flowchart illustrating an example of a method 400 for maintaining synchronization of nodes in a mesh network according to some aspects of the present disclosure. Referring to FIG. 4, at block 410, a child node may determine a time synchronization error for a preferred parent node. The child node may accumulate the time difference between transmission time information provided by the beacons received from the preferred parent node and the local clock of the child node over a specified period of time to determine a cumulative time synchronization error.

The time differences and the cumulative time synchronization error may be measured in microseconds (μs) and may be signed integer values. The accumulated time differences can provide a cumulative time difference (e.g., a time synchronization error) in microseconds. The processor (e.g., the processor 310) of the child node may convert the cumulative time difference to a time synchronization error in parts-per-million (ppm). The specified period of time may be a time period less than a time period equivalent to approximately a 10 parts-per-million (10 ppm) drift rate of time synchronization. The time differences and the cumulative time synchronization error may be stored in the memory of the child node.

At block 415, the child node may optionally determine a time synchronization error for a backup parent node. When a backup parent node is available, the child node may accumulate the time difference between transmission time information provided by the beacons received from the backup parent node and the local clock of the child node over the specified period of time to determine a cumulative time synchronization error. The time differences and the time synchronization error may be stored in the memory of the child node.

At block 420, the cumulative time synchronization error with the preferred parent node may be compared to a first threshold value. The processor of the child node may compare the time synchronization error for the preferred parent node with first threshold value. The first threshold value may be an upper limit threshold value for example, approximately 3 ppm or another value, for the time synchronization error.

At block 425, it may be determined whether the time synchronization error exceeds the first threshold value. In response to determining that the time synchronization error does not exceed the first threshold value (425-N), the method may continue at block 410 to determine the time synchronization error with the preferred parent node. In response to determining that the time synchronization error exceeds the first threshold value (425-Y), at block 430, the child node may transmit an enhanced beacon request (EBR) to the preferred parent node. The EBR may cause the preferred parent node to increase the rate (e.g., decrease the time interval) at which beacons are transmitted for a specified period of time.

At block 435, the time synchronization error with the preferred parent node may be compared to a second threshold value. The second threshold value may be a warning limit threshold value for the time synchronization error and may be greater than the upper limit threshold value for example, approximately 10 ppm or another value. A time synchronization error that exceeds the warning limit threshold may be an indication that the child node may lose time synchronization with the mesh network.

At block 440, it may be determined whether the time synchronization error exceeds the second threshold value. In response to determining that the time synchronization error does not exceed the second threshold value (440-N), the method may continue at block 410 to determine the time synchronization error with the preferred parent node. In response to determining that the time synchronization error exceeds the second threshold value (440-Y), at block 445, a notification may be generated to a central system, for example, the head-end system or another external system. The processor of the child node may cause a notification to be transmitted to the head-end system via the radio (e.g., the radio 350) indicating the time synchronization error may cause the node to lose time synchronization with the mesh network. Corrective action, for example, repair or replacement of the node may be taken by the system administrator (e.g., the utility provider) to address the time synchronization.

At block 450, it may be determined whether a backup parent node is available. In response to determining that a backup parent node is not available (450-N), the method may continue at block 410 to determine the time synchronization error with the preferred parent node. In response to determining that a backup parent node is available (450-Y), at block 455, the time synchronization error for the preferred parent node may be compared with the time synchronization error for the backup parent node. The processor of the child node may compare the time synchronization error for the preferred parent with the synchronization error for the backup parent.

At block 460, it may be determined whether the time synchronization errors of the preferred parent and the backup parent are are within a specified value of each other, for example 20% or another programmable value. In response to determining that the time synchronization errors are similar (460-Y), the method may continue at block 410 to determine the time synchronization error with the preferred parent node. Similar time synchronization errors for the preferred parent and the backup parent may indicate that the time synchronization error is primarily caused by the child node. Action may be taken by the system administrator (e.g., the utility provider) to address the time synchronization error, for example, repair or replacement of the node.

In response to determining that the time synchronization errors are not similar (460-N), at block 465, the child node may change the backup node to be the preferred parent node. A determination that the time synchronization error for the preferred parent node is greater that than the time synchronization error is for the backup parent node may indicate that the preferred parent node is the primary cause of the time drift. The processor of the child node may signal the parent change selection logic (e.g., the parent change selection logic 370) that the time synchronization error for the preferred parent node is not within an acceptable range for maintaining time synchronization with the network. The parent change selection logic may select a different preferred parent node, for example the backup parent node, and may cause messages to be transmitted to the current preferred parent node and the selected preferred parent node indicating the change. The parent change selection logic 370 may further configure the node to receive beacons from the selected preferred parent node. The method may continue at block 410 to determine the time synchronization error with the newly selected preferred parent node.

The specific operations illustrated in FIG. 4 provide a particular method for maintaining synchronization of nodes in a mesh network according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 4 may include multiple sub-operations that may be performed in various sequences as appropriate to the individual operation. Furthermore, additional operations may be added or removed depending on the particular applications.

The method 400, may be embodied on a non-transitory computer readable medium, for example, but not limited to, the memory 320 or other non-transitory computer readable medium known to those of skill in the art, having stored therein a program including computer executable instructions for making a processor, computer, or other programmable device execute the operations of the methods.

Figure 5:
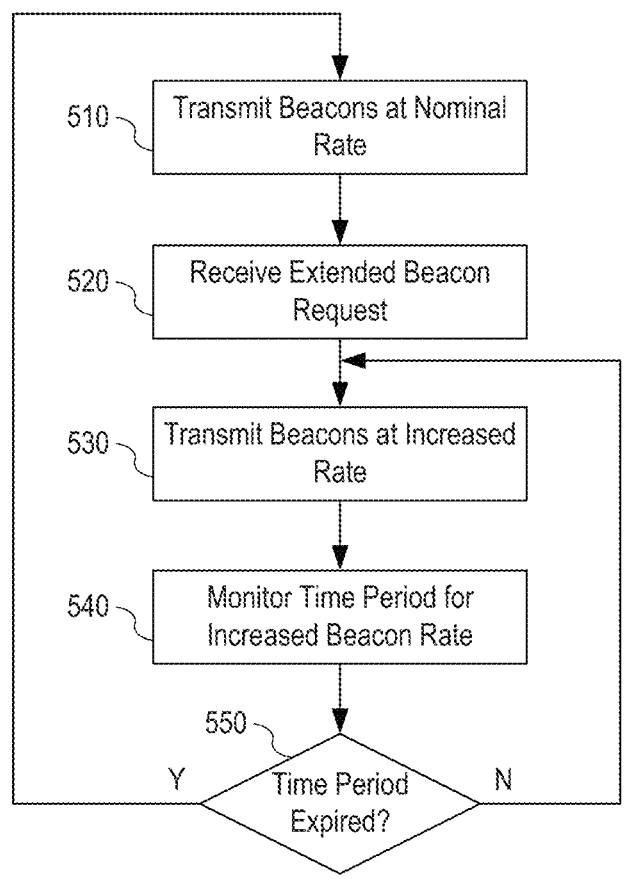
FIG. 5 is a flowchart illustrating an example of a method for adjusting a beacon transmission rate according to some aspects of the present disclosure.

FIG. 5 is a flowchart illustrating an example of a method 500 for adjusting a beacon transmission rate according to some aspects of the present disclosure. Referring to FIG. 5, at block 510, a node may transmit beacons at a nominal transmission rate. For example, a preferred parent node may transmit beacons on a periodic basis that are received by its child nodes. Beacons may be transmitted three to five times during a predetermined time period, for example, but not limited to, a seven minute time period. Other transmission rates and time periods may be used.

At block 520, the node may receive an enhanced beacon request (EBR). The node may be a preferred parent node and may receive the EBR from a child node. The EBR may indicate the address of the child node requesting an increased beacon transmission rate. The preferred parent node may maintain a list (e.g., a neighbor table) of addresses of child nodes from which it received EBRs and the time period for each request.

At block 530, the beacons may be transmitted at an increased rate. The preferred parent node may increase the beacon transmission rate for which an EBR was received for a specified period of time, for example, four hours or another period of time.

At block 540, the duration of the increased beacon transmission rate may be monitored. The preferred parent node may monitor the specified period of time for which a child node will receive increased transmissions. Counters may be implemented by the preferred parent node to track the specified period of time for each child node for which the preferred parent node received an EBR. The counters may be implemented by the processor of the preferred parent node or by circuitry separate from the processor.

At block 550, the node may determine whether the predetermined period of time for the EBR has expired. The preferred parent node may periodically check the list of child node addresses to determine whether the predetermined period of time has expired for any child nodes or whether a child node has moved to a different preferred parent. In response to determining that the predetermined period of time has not expired (550-N), the method may continue at block 530 to continue transmitting beacons at the increased rate. In response to determining that the predetermined period of time has expired for all child nodes for which the preferred parent node has received an EBR (550-Y), the method may continue at block 510 to transmit beacons at the nominal rate.

The specific operations illustrated in FIG. 5 provide a particular method for adjusting a beacon transmission rate according to an embodiment of the present disclosure. Other sequences of operations may also be performed according to alternative embodiments. For example, alternative embodiments of the present disclosure may perform the operations outlined above in a different order. Moreover, the individual operations illustrated in FIG. 5 may include multiple sub-operations that may be performed in various sequences as appropriate to the individual operation. Furthermore, additional operations may be added or removed depending on the particular applications.

The method 500, may be embodied on a non-transitory computer readable medium, for example, but not limited to, a memory or other non-transitory computer readable medium known to those of skill in the art, having stored therein a program including computer executable instructions for making a processor, computer, or other programmable device execute the operations of the methods.

Figure 6:
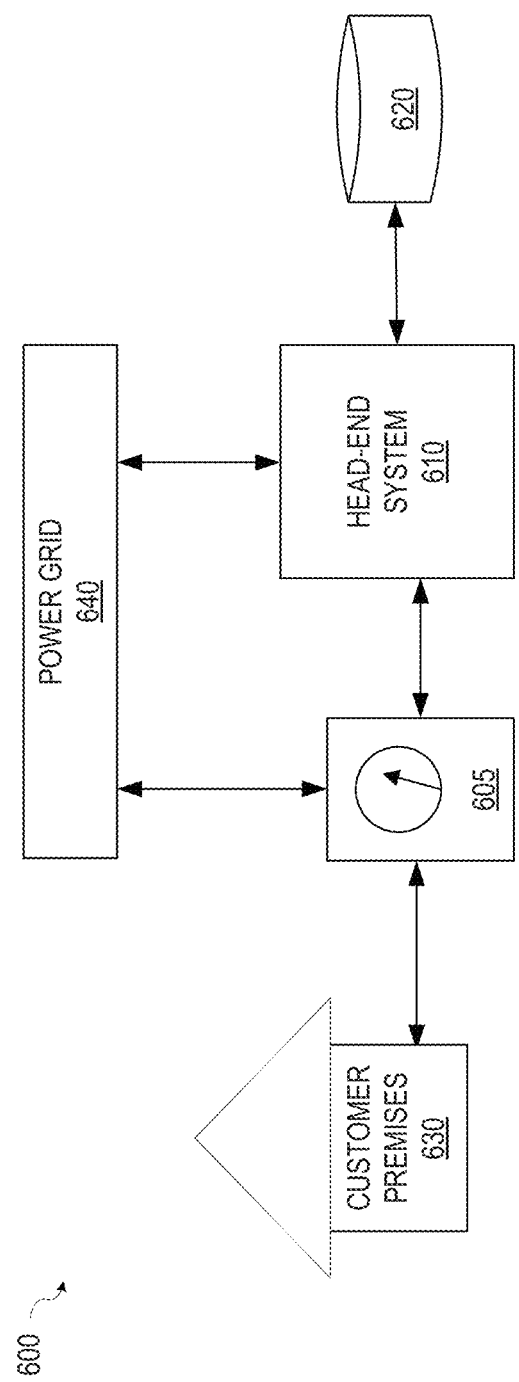
FIG. 6 is diagram illustrating a utility management system according to some aspects of the present disclosure.

FIG. 6 is diagram illustrating a utility management system 600 according to some aspects of the present disclosure. Referring to FIG. 6, the utility management system 600 may include a node 605, a head-end system 610, and a storage device 620. The head-end system 610 and the node 605 may be connected to an electrical power distribution grid 140. The node 605 may be an electric meter connected to a wireless mesh network, for example, an AMI network. The node 605 may monitor and/or record the energy usage at the customer premises 630 and communicate the information about energy usage to the head-end system 610. The node 605 may also communicate status notifications and other information to the head-end system 610.

While FIG. 6 illustrates one node 605 for ease of explanation, a plurality of nodes 605 may be included in the utility management system 600. Not all nodes may be electric meters. Further, multiple networks may exist between the meter and the head-end system or other external system over which the notification may be transmitted.

The examples and embodiments described herein are for illustrative purposes only. Various modifications or changes in light thereof will be apparent to persons skilled in the art. These are to be included within the spirit and purview of this application, and the scope of the appended claims, which follow.

What is claimed is:

1. A method for maintaining synchronization of nodes in a mesh network, the method comprising:
    receiving, by a receiving node, primary beacons from a first transmitting node during a predetermined time interval, each of the primary beacons comprising time information indicating a time that a respective primary beacon was transmitted, the receiving node having a primary association with the first transmitting node;
    comparing the time that each of the primary beacons was transmitted with a time that each of the primary beacons was received as indicated by a clock in the receiving node to determine a time difference;
    accumulating the time difference for each primary beacon received from the first transmitting node during the predetermined time interval to generate a first time synchronization error;
    comparing the first time synchronization error to a first threshold value; and
    in response to determining that the first time synchronization error exceeds the first threshold value, transmitting a first request to the first transmitting node to increase a rate of beacon transmissions for a specified period of time.

2. The method of claim 1, wherein accumulating the time difference comprises adding each determined time difference as a signed integer value.

3. The method of claim 1, further comprising:
  determining, by the receiving node, a second time synchronization error after the specified period of time for receiving beacons at an increased rate expires; and
  in response to determining that the second time synchronization error exceeds the first threshold value, transmitting a second request to the first transmitting node to increase the rate of beacon transmissions.

4. The method of claim 3, wherein the receiving node is prohibited from transmitting additional requests during the specified period of time.

5. The method of claim 1, further comprising:
  comparing the first time synchronization error to a second threshold value; and
  in response to determining that the first time synchronization error exceeds the second threshold value, transmitting a notification to a central system.

6. The method of claim 1, further comprising:
  receiving, by the receiving node, secondary beacons from a second transmitting node during the predetermined time interval, each of the secondary beacons comprising time information indicating a time that a respective secondary beacon was transmitted, the receiving node having a secondary association with the second transmitting node;
  comparing the time that each of the secondary beacons was transmitted with a time that each of the secondary beacons was received as indicated by the clock in the receiving node to determine a time difference;
  accumulating the time difference for each secondary beacon received from the second transmitting node during the predetermined time interval to generate a second time synchronization error;
  comparing the second time synchronization error to the first time synchronization error; and
  in response to determining that the first time synchronization error is greater than the second time synchronization error, causing the receiving node to change the primary association from the first transmitting node to the second transmitting node.

7. A network device, comprising:
  a clock configured to keep a local time;
  a memory configured to store data and instructions;
  a radio configured to communicate with a mesh network; and
  a processor in communication with the clock, the memory, and the radio, the processor configured to:
    receive, via the radio, primary beacons from a first transmitting node during a predetermined time interval, each of the primary beacons comprising time information indicating a time that a respective primary beacon was transmitted, the network device having a primary association with the first transmitting node;
    compare the time that each of the primary beacons was transmitted with a time that each of the primary beacons was received as indicated by the clock to determine a time difference;
    accumulate the time difference for each primary beacon received from the first transmitting node during the predetermined time interval to generate a first time synchronization error;
    compare the first time synchronization error to a first threshold; and
    in response to determining that the first time synchronization error exceeds the first threshold, transmit, via the radio, a first request to the first transmitting node to increase a rate of beacon transmissions.

8. The network device of claim 7, further comprising a first counter, wherein the first counter is configured to accumulate the time difference for the primary beacons by adding each determined time difference as a signed integer value.

9. The network device of claim 7, wherein the processor is further configured to:
  receive, via the radio, the primary beacons from the first transmitting node at an increased beacon transmission rate for a specified period of time based on the first request, wherein the increased beacon transmission rate ends when the specified period of time expires.

10. The network device of claim 9, wherein the processor is further configured to:
  in response to determining that the first time synchronization error exceeds the first threshold after the specified period of time expires, transmit a second request to the first transmitting node to increase the rate of beacon transmissions.

11. The network device of claim 10, wherein the processor is further configured to:
  prohibit the network device from transmitting additional requests during the specified period of time.

12. The network device of claim 7, wherein the processor is further configured to:
  compare the first time synchronization error to a second threshold; and
  in response to determining that the first time synchronization error exceeds the second threshold, transmit a notification to a central system.

13. The network device of claim 7, wherein the processor is further configured to:
  receive secondary beacons from a second transmitting node during the predetermined time interval, each of the secondary beacons comprising time information indicating a time that a respective secondary beacon was transmitted, the network device having a secondary association with the second transmitting node;
  compare the time that each of the secondary beacons was transmitted with a time that each of the secondary beacon was received as indicated by the clock to determine a time difference;
  accumulate the time difference for each secondary beacon received from the second transmitting node during the predetermined time interval to generate a second time synchronization error;
  compare the second time synchronization error to the first time synchronization error; and
  in response to determining that the first time synchronization error exceeds the second time synchronization error, change the primary association of the network device from the first transmitting node to the second transmitting node.

14. The network device of claim 13, further comprising a second counter, wherein the second counter is configured to accumulate the time difference for the secondary beacons by adding each determined time difference as a signed integer value.

15. A non-transitory computer readable medium having stored therein instructions for making one or more processors of a receiving node execute a method for maintaining synchronization of nodes in a mesh network, the processor executable instructions comprising instructions for performing operations including:

receiving primary beacons from a first transmitting node during a predetermined time interval, each of the primary beacons comprising time information indicating a time that a respective primary beacon was transmitted, the receiving node having a primary association with the first transmitting node;

comparing the time that each of the primary beacons was transmitted with a time that each of the primary beacons was received as determined by a local clock to determine a time difference;

accumulating the time difference for each primary beacon received from the first transmitting node during the predetermined time interval to generate a first time synchronization error;

comparing the first time synchronization error to a first threshold value; and in response to determining that the first time synchronization error exceeds the first threshold value, transmitting a first request to the first transmitting node to increase a rate of beacon transmissions.

16. The non-transitory computer readable medium as defined in claim 15, further comprising instruction for performing operations including:

receiving the primary beacons at an increased beacon transmission rate for a specified period of time based on the first request, wherein the increased beacon transmission rate ends when the specified period of time expires.

17. The non-transitory computer readable medium as defined in claim 16, further comprising instruction for performing operations including:

in response to determining that the first time synchronization error exceeds the first threshold value after the specified period of time expires, transmitting a second request to the first transmitting node to increase the rate of beacon transmissions.

18. The non-transitory computer readable medium as defined in claim 17, wherein additional requests are prohibited from being transmitted during the specified period of time.

19. The non-transitory computer readable medium as defined in claim 15, further comprising instruction for performing operations including:

comparing the first time synchronization error to second threshold value; and in response to determining that the first time synchronization error exceeds the second threshold value, transmitting a notification to a central system.

20. The non-transitory computer readable medium as defined in claim 15, further comprising instruction for performing operations including:

receiving secondary beacons from a second transmitting node during the predetermined time interval, each of the secondary beacons comprising time information indicating a time that a respective secondary beacon was transmitted, the receiving node having a secondary association with the second transmitting node;

comparing the time that each of the secondary beacons was transmitted with a time that each of the secondary beacons was received to determine a time difference;

accumulating the time difference for each secondary beacon received from the second transmitting node during the predetermined time interval to generate a second time synchronization error;

comparing the second time synchronization error to the first time synchronization error; and in response to determining that the first time synchronization error exceeds the second time synchronization error, changing the primary association from the first transmitting node to the second transmitting node for receiving beacons.

* * * * *